(12) United States Patent
Mittal et al.

(10) Patent No.: US 10,911,123 B2
(45) Date of Patent: Feb. 2, 2021

(54) CSI FEEDBACK WITH TYPE-II CODEBOOK COMPRESSION

(71) Applicant: Lenovo (Singapore) PTE. LTD., New Tech Park (SG)

(72) Inventors: Udar Mittal, Rolling Meadows, IL (US); Tyler Brown, Lake Zurich, IL (US); Ahmed Hindy, Forest Park, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/741,621

(22) Filed: Jan. 13, 2020

(65) Prior Publication Data
US 2020/0228177 A1    Jul. 16, 2020

Related U.S. Application Data

(60) Provisional application No. 62/791,721, filed on Jan. 11, 2019, provisional application No. 62/791,706, filed on Jan. 11, 2019.

(51) Int. Cl.
*H04B 7/06* (2006.01)
*H04B 7/0456* (2017.01)
*H04L 27/26* (2006.01)

(52) U.S. Cl.
CPC ......... *H04B 7/0626* (2013.01); *H04B 7/0456* (2013.01); *H04L 27/2613* (2013.01)

(58) Field of Classification Search
CPC .. H04B 7/0626; H04B 7/0456; H04B 7/0478; H04B 7/0663; H04L 27/2613
See application file for complete search history.

(56) References Cited

U.S. PATENT DOCUMENTS

| | | | |
|---|---|---|---|
| 2016/0142117 A1* | 5/2016 | Rahman | H04B 7/0469 |
| | | | 375/267 |
| 2016/0294457 A1* | 10/2016 | Lee | H04B 7/0663 |
| 2019/0223117 A1* | 7/2019 | Chai | H04W 52/367 |
| 2019/0319682 A1* | 10/2019 | Zhang | H04B 7/0617 |
| 2020/0067581 A1* | 2/2020 | Osawa | H04W 72/046 |
| 2020/0228177 A1 | 7/2020 | Mittal et al. | |
| 2020/0228178 A1 | 7/2020 | Mittal et al. | |

(Continued)

OTHER PUBLICATIONS

U.S. Appl. No. 16/741,673 Office Action Summary, dated Aug. 5, 2020, pp. 1-20.

(Continued)

*Primary Examiner* — Jean B Corrielus
(74) *Attorney, Agent, or Firm* — Kunzler Bean & Adamson

(57) ABSTRACT

For Type-II codebook compression, methods, apparatus, and systems are disclosed. One apparatus includes a transceiver that receives a reference signal and a processor that identifies a set of beams based on the reference signal. The processor generates a set of coefficients associated with each beam in the set of beams based on the reference signal and identifies a set of tap indices, where the set of tap indices is a common subset of coefficient indices that is the same over the set of beams. The processor generates a combinatorial codeword representing the set of tap indices and reports the combinatorial codeword for the set of tap indices as part of a CSI feedback report.

20 Claims, 10 Drawing Sheets

(56) References Cited

U.S. PATENT DOCUMENTS

2020/0252112 A1* 8/2020 Zhan ................... H04B 7/0456

OTHER PUBLICATIONS

PCT/IB2020/000044, Notification of Transmittal of the International Search Report and the Written Opinion of the International Searching Authority, or the Declaration, PCT, dated May 12, 2020, pp. 1-15.

PCT/IB2020/000057, Notification of Transmittal of the International Search Report and the Written Opinion of the International Searching Authority, or the Declaration, PCT, dated May 25, 2020, pp. 1-15.

Catt, "Codebook enhancement for advanced CSI", 3GPP TSG RAN WG1 Meeting #87 R1-1611335, Nov. 14-18, 2016, pp. 1-12.

Motorola Mobility / Lenovo, "Considerations on Type II CSI enhancement", 3GPP TSG RAN WG1 Ad-Hoc Meeting 1901 R1-1900943, Jan. 21-25, 2019, pp. 1-15.

Nokia, Nokia Shanghai Bell, "CSI Enhancements for MU-MIMO Support", 3GPP TSG RAN WG1 Meeting #94-bis R1-1811406, Oct. 8-12, 2018, pp. 1-13.

L. Suarez et al., "DFT based Beam-Time Delay Sparse Channel Representation for Channel State Information (CSI) Compression in 5G FDD Massive MIMO Systems", IEEE International Black Sea Conference on Communications and Networking, 2018, pp. 1-6.

NEC, "On the subband definition in CSI Signalling", 3GPP TSG-RAN WG3 Meeting #88 R3-150992, May 25-29, 2015, pp. 1-6.

Catt, "Phase preprocessing for Type II CSI enhancement", 3GPP TSG RAN WG1 Meeting #97 R1-1906348, May 13-17, 2019, pp. 1-4.

Motorola Mobility / Lenovo, "Quantizer Normalization for Type-2 Codebook Compression", 3GPP TSG RAN WG1 Ad-Hoc Meeting 1901 R1-1900945, Jan. 21-25, 2019, pp. 1-5.

Nokia, Nokia Shanghai Bell, "Reduced PMI Payload in the NR Type II Codebooks", 3GPP TSG-RAN WG1 Meeting NR#3 R1-1716505, Sep. 18-21, 2017, pp. 1-5.

Suarez et al., "Reduced Redundancy Indexing for Beam-Time Delay CSI Compression in 5G FDD Massive MIMO System", IEEE International Black Sea Conference on Communications and Networking, 2019, pp. 1-5.

Intel Corporation, "Type II CSI feedback compression", 3GPP TSG RAN WG1 Ad-Hoc Meeting 1901 R1-1900501, Jan. 21-25, 2019, pp. 1-15.

Motorola Mobility / Lenovo, "Type II CSI overhead reduction", 3GPP TSG RAN1#95 R1-1813357, Nov. 12-16, 2018, pp. 1-8.

Huawei, Hisilicon, "Introduction of UE capability constraints", 3GPP TSG-RAN WG2 Meeting#103 R2-1813357, Aug. 20-24, 2018, pp. 1-2.

* cited by examiner

| 1st Stage Beam Energies | Beam Rank | Mi | |
|---|---|---|---|
| 104 | 7 | 2 | Beam1 |
| 228 | 1 | 4 | Beam2 |
| 64 | 8 | 2 | Beam3 |
| 120 | 6 | 3 | Beam4 |
| 124 | 5 | 3 | Beam5 |
| 184 | 2 | 4 | Beam6 |
| 160 | 4 | 3 | Beam7 |
| 176 | 3 | 3 | Beam8 |

| | Coefficient Indices | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Beam1 | 0 | 0 | 5 | 6 | 2 | 2 | 2 | 4 | 2 | 0 | 2 | 0 | 4 |
| Beam2 | 6 | 0 | 2 | 2 | 6 | 2 | 4 | 0 | 4 | 7 | 7 | 6 | 2 |
| Beam3 | 2 | 5 | 2 | 0 | 2 | 5 | 0 | 0 | 2 | 2 | 2 | 2 | 2 |
| Beam4 | 5 | 4 | 2 | 7 | 0 | 0 | 2 | 2 | 2 | 0 | 4 | 2 | 4 |
| Beam5 | 0 | 0 | 5 | 5 | 4 | 6 | 4 | 0 | 2 | 0 | 4 | 2 | 0 |
| Beam6 | 4 | 4 | 4 | 2 | 2 | 2 | 4 | 0 | 4 | 2 | 4 | 6 | 7 |
| Beam7 | 5 | 0 | 0 | 7 | 2 | 4 | 4 | 4 | 2 | 4 | 2 | 4 | 4 |
| Beam8 | 2 | 0 | 6 | 0 | 4 | 4 | 6 | 2 | 4 | 2 | 2 | 2 | 6 |

FIG. 3B

Coefficient Indices — 405

| | 1 | 2 | 3 | 4 | 5 | 6 | 7 | 8 | 9 | 10 | 11 | 12 | 13 | |
|---|---|---|---|---|---|---|---|---|---|---|---|---|---|---|
| | 0 | 0 | 4 | 6 | 2 | 2 | 2 | 4 | 2 | 0 | 2 | 0 | 4 | Beam1 |
| | 6 | 0 | 2 | 2 | 6 | 2 | 4 | 0 | 4 | 6 | 6 | 6 | 2 | Beam2 |
| | 2 | 4 | 2 | 0 | 2 | 4 | 0 | 0 | 2 | 2 | 2 | 2 | 2 | Beam3 |
| | 4 | 4 | 2 | 6 | 0 | 0 | 2 | 2 | 2 | 0 | 4 | 2 | 4 | Beam4 |
| | 0 | 0 | 4 | 4 | 4 | 6 | 4 | 0 | 2 | 0 | 4 | 2 | 0 | Beam5 |
| | 4 | 4 | 4 | 2 | 2 | 2 | 4 | 0 | 4 | 2 | 4 | 6 | 6 | Beam6 |
| | 4 | 0 | 0 | 6 | 2 | 4 | 4 | 4 | 2 | 4 | 2 | 4 | 4 | Beam7 |
| | 2 | 0 | 6 | 0 | 4 | 4 | 6 | 2 | 4 | 2 | 2 | 2 | 6 | Beam8 |

FIG. 4A

410 — Coefficient Indices

| | 1 | 2 | 3 | 4 | 5 | 6 | 7 | 8 | 9 | 10 | 11 | 12 | 13 |
|---|---|---|---|---|---|---|---|---|---|---|---|---|---|
| Beam1 | | | 1 | 0 | | | | | | | | | |
| Beam2 | 0 | | | | 0 | | | | | 1 | 1 | | |
| Beam3 | | 1 | | | | 1 | | | | | | | |
| Beam4 | 1 | 0 | | 1 | | | | | | | | | |
| Beam5 | | | 1 | 1 | | 0 | | | | | | | |
| Beam6 | 0 | 0 | | | | | | | | | | 0 | 1 |
| Beam7 | 1 | | | 1 | | 0 | | | | | | | |
| Beam8 | | | 0 | | | | 0 | | | | | | 0 |

| | Coefficient Indices | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Beam1 | 0 | 0 | 4 | 6 | 2 | 2 | 2 | 4 | 2 | 0 | 2 | 0 | 4 |
| Beam2 | 6 | 0 | 2 | 2 | 6 | 2 | 4 | 0 | 4 | 6 | 6 | 6 | 2 |
| Beam3 | 2 | 4 | 2 | 0 | 2 | 4 | 0 | 0 | 2 | 2 | 2 | 2 | 2 |
| Beam4 | 4 | 4 | 2 | 6 | 0 | 0 | 2 | 2 | 2 | 0 | 4 | 2 | 4 |
| Beam5 | 0 | 0 | 4 | 4 | 4 | 6 | 4 | 0 | 2 | 0 | 4 | 2 | 0 |
| Beam6 | 4 | 4 | 4 | 2 | 2 | 2 | 4 | 0 | 4 | 2 | 4 | 6 | 6 |
| Beam7 | 4 | 0 | 0 | 6 | 2 | 4 | 4 | 4 | 2 | 4 | 2 | 4 | 4 |
| Beam8 | 2 | 0 | 6 | 0 | 4 | 4 | 6 | 2 | 4 | 2 | 2 | 2 | 6 |

FIG. 5A

2nd Stage Amplitudes 510

| 0 | 0 | 1 | 1 | 0 | 0 | 0 | 1 | 0 | 0 | 0 | 1 | 1 | 0 |
|---|---|---|---|---|---|---|---|---|---|---|---|---|---|
| 1 | 1 | 0 | 1 | 0 | 1 | 1 | 0 | 1 | 1 | | | | |

| | Coefficient Indices | | | | | | | | | | | | |
|---|---|---|---|---|---|---|---|---|---|---|---|---|---|
| | *1* | *2* | *3* | *4* | *5* | *6* | *7* | *8* | *9* | *10* | *11* | *12* | *13* |
| *Beam1* | 0 | 0 | 1 | 1 | 0 | 0 | 0 | 0 | 0 | 0 | 0 | 0 | 0 |
| *Beam2* | 1 | 0 | 0 | 0 | 1 | 0 | 0 | 0 | 0 | 1 | 1 | 0 | 0 |
| *Beam3* | 0 | 1 | 0 | 0 | 0 | 1 | 0 | 0 | 0 | 0 | 0 | 0 | 0 |
| *Beam4* | 1 | 1 | 0 | 1 | 0 | 0 | 0 | 0 | 0 | 0 | 0 | 0 | 0 |
| *Beam5* | 0 | 0 | 1 | 1 | 0 | 1 | 0 | 0 | 0 | 0 | 0 | 0 | 0 |
| *Beam6* | 1 | 1 | 0 | 0 | 0 | 0 | 0 | 0 | 0 | 0 | 0 | 1 | 1 |
| *Beam7* | 1 | 0 | 0 | 1 | 0 | 1 | 0 | 0 | 0 | 0 | 0 | 0 | 0 |
| *Beam8* | 0 | 0 | 1 | 0 | 0 | 0 | 1 | 0 | 0 | 0 | 0 | 0 | 1 |

| | Coefficient Indices | | | | | | | | | | | | | |
|---|---|---|---|---|---|---|---|---|---|---|---|---|---|---|
| | *1* | *2* | *3* | *4* | *5* | *6* | *7* | *8* | *9* | *10* | *11* | *12* | *13* | |
| | | | 5 | 6 | | | | | | | | | | *Beam1* |
| | 6 | | | | 6 | | | | | 7 | 7 | | | *Beam2* |
| | | 5 | | | | 5 | | | | | | | | *Beam3* |
| | 5 | 4 | | 7 | | | | | | | | | | *Beam4* |
| | | | 5 | 5 | | 6 | | | | | | | | *Beam5* |
| | 4 | 4 | | | | | | | | | | 6 | 7 | *Beam6* |
| | 5 | | | 7 | | 4 | | | | | | | | *Beam7* |
| | | | 6 | | | | 6 | | | | | | 6 | *Beam8* |

FIG. 6B

CSI FEEDBACK WITH TYPE-II CODEBOOK COMPRESSION

CROSS-REFERENCE TO RELATED APPLICATIONS

This application claims priority to U.S. Provisional Patent Application No. 62/791,706 entitled "Type-2 Codebook Compression Using Phase Modification" and filed on Jan. 11, 2019 for Udar Mittal, Tyler Brown, and Ahmed M. Hindy, and to U.S. Provisional Patent Application No. 62/791,721 entitled "Type-2 Codebook Compression Using Phase Modification" and filed on Jan. 11, 2019 for Udar Mittal, Tyler Brown, and Ahmed M. Hindy, which applications are incorporated herein by reference.

FIELD

The subject matter disclosed herein relates generally to wireless communications and more particularly relates to reporting CSI feedback with Type-II codebook compression using DFT-based Type-II codebook compression.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In 3GPP New Radio ("NR") systems, Type-1 and Type-II codebook based channel state information ("CSI") feedback have been adopted to support advanced MIMO transmission. Both types of codebooks are constructed from two-dimension DFT-based grid of beams and enable the CSI feedback of beam selection as well as PSK based co-phase combining between two polarizations. Type-1 codebooks are used for standard resolution CSI feedback, while Type-II (also referred to as "Type-II") codebooks are used for high resolution CSI feedback. As a result, it is envisioned that more accurate CSI can be obtained from Type-II codebook based CSI feedback so that better precoded MIMO transmission can be employed by the network.

One Type-II precoding compression scheme was described based on transforming each beam's frequency-domain precoding vectors to the time domain and selecting a subset of the time-domain components which would then be fed back the gNB. The gNB would then perform the inverse transformation to the frequency domain to determine the set of 2L precoding vectors or beams. However, such feedback has a large overhead

BRIEF SUMMARY

Disclosed are methods for Type-II codebook compression. Apparatuses and systems also perform the functions of the methods.

One method of a UE device for Type-II codebook compression using a Discrete Fourier Transformation-based Type-II codebook compression includes receiving a reference signal and identifying a set of beams based on the reference signal. The first method includes generating a set of coefficients associated with each beam in the set of beams based on the reference signal and identifying a set of tap indices wherein the set of tap indices is a common subset of coefficient indices that is the same over the set of beams. The first method includes generating a combinatorial codeword representing the set of tap indices and reporting the combinatorial codeword for the set of tap indices as part of a CSI feedback report.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a diagram illustrating one embodiment of beam energies; FIG. 3B is a diagram illustrating one embodiment of resultant beam coefficient taps according to the beam energies of FIG. 3A;

FIG. 4A is a diagram illustrating one embodiment of first stage quantization according to the beam coefficients of FIG. 3B; FIG. 4B is a diagram illustrating one embodiment of second stage quantization according to the beam coefficients of FIG. 3B;

FIG. 5A is a diagram illustrating another embodiment of first stage quantization according to the beam coefficients of FIG. 3B; FIG. 5B is a diagram illustrating another embodiment of second stage quantization according to the beam coefficients of FIG. 3B;

FIG. 6A is a diagram illustrating one embodiment of first stage quantization to produce a bitmap according to the beam coefficients of FIG. 3B; FIG. 6B is a diagram illustrating one embodiment of second stage quantization according to the beam coefficients of FIG. 3B;

DETAILED DESCRIPTION

Figure 1:
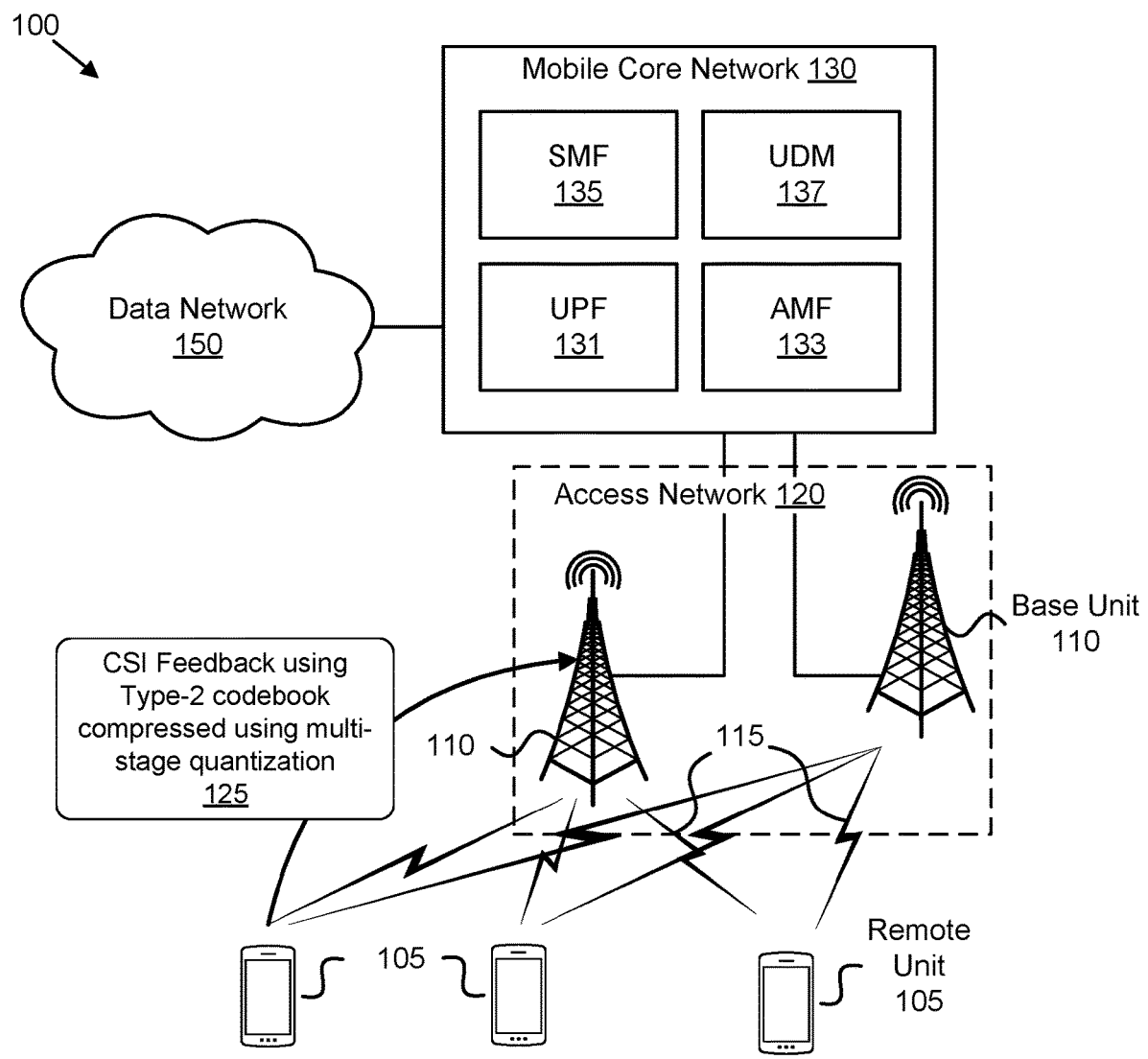
FIG. 1 is a schematic block diagram illustrating one embodiment of a wireless communication system for CSI feedback with Type-II codebook compression.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for reporting CSI feedback using improved Type-II codebook compression. Here, the UE may encode different beams with different number of taps and each tap may be coded using different number of quantization bits. As such, there is an overhead just to identify and represent which beam with different number of taps and to identify how many bits are used to code these taps.

Disclosed herein are techniques for multi-stage quantization of taps, thereby improving the Discrete Fourier Transform ("DFT") based Type-II codebook compression. Codebook compression improves transmission efficiency because fewer bits need to be sent over the air interface from transmitter (e.g., UE) to receiver (e.g., gNB or other RAN node). To improve DFT-based Type-II codebook compression, the transmitting device (e.g., a UE) identifies a set of beams based on the reference signal and performs an initial (first-stage) quantization. The transmitting device also selects a subset of the beams identifies beams and perform second stage quantization. In various embodiments, the first-stage quantization is a low-resolution quantization and the second-stage quantization is a high-resolution quantization.

To support multi-stream transmission in MIMO wireless communications, precoding may be used to achieve better transmission directionality. In a multi-user MIMO environment, downlink precoding is used to improve transmission directionality for each user. Here, precoding is an interference pre-cancellation technique that exploits the spatial degrees of freedom offered by the multiple transmit antennas (Nt). Downlink channels are measured using downlink reference signals ("DL-RS") sent from the RAN node to the UE. The RAN node transmits DL-RS using, e.g., 2Nt antennas (the factor of '2' account for the two polarizations at the RAN node antennas) and over Nf frequency bands. Based on the channel measurements, the UE reports parameters in a CSI report to the RAN node, enabling the RAN node to construct an efficient precoder to predict the downlink channel. As will be understood by one of ordinary skill in the art, there is a tradeoff between the size of the CSI reports (overhead) and the performance of the precoder given the CSI reports (throughput).

One type of spatial compression scheme determines the set of 2L precoding vectors or beams or basis, where 2L<2Nt. The precoding vector at frequency sub-band k (0≤k<Nsb) is a linear combination of a subset of a predefined basis (i.e., DFT matrix) per sub-band which cover different spatial directions. Here, Nsb is the number of sub-bands. This technique uses spatial compression to reduce the number of bits reported to be proportional to 2L<2Nt.

If the beam selection matrix is denoted $$W_1 = \begin{bmatrix} B & 0 \\ 0 & B \end{bmatrix}$$

Then the resulting $2N_1N_2 \times N_{sb}$ precoding matrix for a layer can then be expressed as $$W = W_1 \tilde{w}_2^H V \qquad \text{Equation (1)}$$

In Equation 1, H means the Hermitian of a matrix, V is the size $N_{sb}$ DFT matrix and $\tilde{W}_2 = [\tilde{w}_{2,1} \ \tilde{w}_{2,2} \ \ldots \ \tilde{w}_{2,2L}]$ is comprised of 2L time-domain coefficient vectors of length $N_{sb}$, and $W_2 \triangleq \tilde{w}_2^H V$. W is a set of $2N_1N_2 \times 1$ dimensional precoding vectors (each row is a precoding vector), one each for each of $N_{sb}$ sub-bands.

The precoder per layer may be expressed as $$W(k) = W_1 W_2(k) = \begin{bmatrix} B & 0 \\ 0 & B \end{bmatrix} \times \begin{bmatrix} v_{0,k} \\ \ldots \\ v_{2l-1,k} \end{bmatrix} \qquad \text{Equation (2)}$$

In Equation 2, the layer-common $W_1$ is $2Nt \times 2L$, the per-layer $W_2(k)$ has size $2L \times 1$ and the columns of the Nt×L matrix $B = [b_1 \ b_2 \ b_{L-1}]$ are columns of a size-Nt standard two-dimensional DFT matrix.

Another Type-II precoding compression scheme transforms a subset of the beam's frequency-domain precoding vectors to the time domain and selects a subset of the time-domain components which would then be fed back the RAN node. The RAN node then performs the inverse transformation back to the frequency domain to determine the set of precoding vectors or beams. The subset of predefined precoding vectors cover different frequency sub-bands. Here, the UE reports 1) L DFT special basis indices (where L<Nt), 2) M DFT frequency-domain basis indices (where M<Nsb), and 3) 2L×M number of linear combinatorial coefficients (i.e., complex coefficients having both amplitude and phase). This technique uses both spatial compression and frequency compression to reduce the number of bits reported as 2LM<2LNsb<2NtNsb.

The precoder per layer may be expressed as:

$$W = W_1 \tilde{W}_2 W_3^H = \begin{bmatrix} B & 0 \\ 0 & B \end{bmatrix} \times \begin{bmatrix} \tilde{v}_{0,0} & \ldots \\ \ldots & \tilde{v}_{2L-1,M-1} \end{bmatrix} W_3^H \qquad \text{Equation (3)}$$

In Equation 3, B is the same over all layers. Here $\tilde{W}_2$ is reported by layer with size 2L×M and the columns of the Nsb×M matrix $W_3 = [f_0 \ \ldots \ f_{M-1}]$ are columns of a size-Nsb standard DFT matrix, also reported per layer.

For $\tilde{W}_2$, the element $\tilde{v}_{l,m}$ represents the quantized amplitude and phase of the coefficient. The multi-stage quantization techniques described herein use variable quantization resolution for $\tilde{v}_{l,m}$ based on amplitude value, without need for extra signaling to indicate weak coefficients. One embodiment of multi-stage quantization is a two-stage quantization where low-resolution coefficients have $q_A$ bits to indicate the amplitude coefficient and $q_P$ bits to indicate the phase coefficient. Additional bits are used with high-resolution coefficients, such that they have $q_A + q'_A$ bits to indicate the amplitude coefficient and $q_P+q'_P$ bits to indicate the phase coefficient. A rule known to both the transmitting device (e.g., UE) and the receiving device (e.g., gNB) determines the quantization resolution based on coarse amplitude of the coefficient. For example, an amplitude threshold may be used to determine whether a coefficient is high-resolution or low-resolution, where the value of the threshold is predetermined and/or known by both UE and gNB.

The following steps are typically performed for generation of $\tilde{W}_2$:

First, compute $W_1$ given the channel matrix ($H_{Sb}$) for each of the $N_{sb}$ sub-bands.

Second, compute $W_2$ using the estimate of the channel matrix ($H_{sb}$) and $W_1$. This step requires finding the singular vectors corresponding to the highest (e.g., largest) singular value of the equivalent channel matrices $H_{sb}W_1$ for each sub-band. Each column of $W_2$ is the singular vector of one sub-band.

Second, $\tilde{W}_2$, can be computed by taking the inverse Fourier transform of the rows of $W_2$ i.e., $$\tilde{W}_2 = VW_2^H \quad \text{Equation (4)}$$

Feedback overhead may be reduced when the UE reports an indication of non-zero subset of the coefficients in $\tilde{W}_2$, e.g., those coefficients with the largest magnitudes. The feedback overhead also depends on how many quantization bits are used to represent these coefficients.

The coding approach should be such that the non-zero entries can be identified and quantized in few bits without any significant performance loss. As used herein these non-zero entries will be referred as "taps."

It is expected that not all beams will carry equal energy and therefore each beam need not be represented with an equal number of coefficients. On the other hand, allowing all coefficients to represent bases of a single beam limits the parallelization of coefficient selection at the UE. In addition, allowing complete freedom for the UE to select the number of coefficients reported incurs higher overhead compared to tapering the number of reported bases from the strongest beam down to the weakest beam in some fixed or higher-layered configured pattern.

In order to decrease the number of bits to identify the non-zero entries, it is important to select a subset of size $K < N_{sb}$ from which the taps for each beam is selected. Because the UE needs to allocate amplitude and phase bits for all non-zero entries, coding efficiency may be improved by allocating fewer number of taps for some of the beams. Thus, assuming that of the 2L beams, $L_1$ beams have $M_1$ taps, $L_2$ beams have $M_2$ taps, . . . and $L_q$ beams $M_q$ taps, respectively. Note that there are K possible common taps over all beams, where $K \leq N_{sb}$. Here it is assumed that it is a priori known in the wireless network that $M_1$ taps to will be allocated to $L_1$ beams, $M_2$ taps to $L_2$ beams and so on. However, it is not known a priori which of the $L_i$ beams have $M_i$ taps.

$$2L = \Sigma_{k=1}^{q} L_k \quad \text{Equation (5)}$$

Here it is assumed that the taps $M_k$ are in decreasing order. Note that $M_k \leq K$. It is also assumed that $M_1$ (largest number of taps over all beams) is equal to K. To further save quantization bits, stronger taps may be coded with more amplitude and phase bits and other taps with less bits.

Once beams and their corresponding taps are selected, but before quantizing the taps, a coding scheme is to represent a) which beams and taps are quantized and b) how many bits are used to quantize each tap. One way to encode this information is using first a bitmap for deciding which tap has to be quantized and which tap is not quantized.

Another approach is an enumerative or combinatorial approach. Here, an expression for the number of bits is needed to code using an enumerative approach. For now, it is assumed that all taps are coded using the same number of bits.

To identify the common K taps, the number of bits A is first identified using the ceiling function:

$$A = \left\lceil \log_2 \binom{N_{sb}-1}{K-1} \right\rceil \quad \text{Equation (6)}$$

Here, $\binom{N_{sb}-1}{K-1}$ is a combinatorial function which is equal to the number of combinations of selecting K−1 taps out of Nsb−1 sub-bands, Nsb represents the sub-band size and the value K−1 is used because the first tap of the main beam is always selected, and main beam is identifiable. For example, the main beam may be identified using normalization and/or phase modification as discussed in U.S. Provisional Application 62/791,706. Note that the parameter K in Equation 6 may be the same as the parameter M in Equation 3, above.

To identify the beams with $M_1, M_2, \ldots M_q$ taps, using the combinatorial approach and assuming that the rule assigning the taps to beams is such that the main beam (which is identifiable) always has max number of taps ($M_1$) then the number of bits B is identified, using the ceiling function:

$$B = \left\lceil \log_2 \binom{2L-1}{L_1-1} + \sum_{k=2}^{q} \log_2 \binom{2L - \sum_{j=1}^{k-1} L_j}{L_k} \right\rceil \quad \text{Equation (7)}$$

Once beams are identified, the taps within a beam need to be identified. Again, using a coding approach such that the max tap of the main beam is the first tap means that no bits are needed to identify the first tap of the main beam. Accordingly, the number of bits C to identify the tap location within the beam is given by:

$$C = \left\lceil \log_2 \binom{K-1}{M_1-1} + (L_1-1) \cdot \log_2 \binom{K}{M_1} + \sum_{k=2}^{q} L_k \cdot \log_2 \binom{K}{M_k} \right\rceil \quad \text{Eq. (8)}$$

FIG. 1 depicts an embodiment of a wireless communication system 100 Type-II codebook compression, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 150, like the Internet and private data networks, among other data networks. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as described by the Broadband Forum ("BBF").

The mobile core network 130 includes several network functions ("NFs"). As depicted, the mobile core network 130 includes an access and mobility management function ("AMF") 133, a session management function ("SMF") 135, and a user plane function ("UPF") 131. Although a specific number of AMFs 133, SMFs 135, and UPFs 131 are depicted in FIG. 1, one of skill in the art will recognize that any number and type of network function may be included in the mobile core network 130.

The AMF 133 provides services such as UE registration, UE connection management, and UE mobility management. The SMF 135 manages the data sessions of the remote units 105, such as a PDU session. The UPF 131 provides user plane (e.g., data) services to the remote units 105. A data connection between the remote unit 105 and a data network 150 is managed by a UPF 131. The UDM 137 provides user identification handling, access authorization, subscription management, etc.

To support spatial multiplexing and MU-MIMO, the remote unit 105 provides CSI feedback 125 to the base unit 110 using Type-II codebook compression using multi-stage quantization. The remote unit 105 generates a set of modified channel matrix ($H_{SB} W_1$), where ($H_{SB}$) is an estimate of channel matrices for a set of sub-bands and ($W_1$) is the beam space matrix. The remote unit 105 also generates a set of singular vector coefficients ($W_2$) from the modified channel matrix.

The remote unit 105 performs an inverse DFT of the singular vector coefficients to generate a set of taps. The remote unit 105 quantizes a set of taps using a first stage quantizer to generate a set of quantized taps, identifies a set of beams and a corresponding set of taps allocated to the set of beams based on the set of quantized taps, and quantizes the corresponding set of taps using a second stage quantizer, as described in greater detail below.

In various embodiments, the remote unit 105 uses a multi-stage quantization technique in which the first stage quantizer provides a crude quantization of tap magnitudes using a smaller number of bits. The first stage quantizer enables identifying non-zero taps and bits to be used to quantize non-zero taps in the second stage quantizer. The first stage quantizer's ability to jointly perform different tasks significantly decreases the bit overhead.

In some embodiments, the remote unit 105 uses a multi-stage quantization technique in which the first stage quantizer uses a single bit to indicate which coefficients are high-resolution. As discussed above, the first stage quantization generates coarse amplitude values of the coefficients. The result of the first stage quantization is a bitmap. The remote unit 105 then uses additional bits to encode the amplitude and phase coefficients for the high-resolution taps.

When using variable-resolution quantization (i.e., achieved using multi-stage quantization), the set of singular vector coefficients ($W_2$) per layer may be expressed as:

$$W_2 = \Lambda_{A1} \odot \Lambda_{A2} \odot e^{-j2\pi\phi} = \begin{bmatrix} \lambda^{(1)}_{0,0} & \cdots & \lambda^{(1)}_{0,M-1} \\ \vdots & \ddots & \vdots \\ \lambda^{(1)}_{2L-1,0} & \cdots & \lambda^{(1)}_{2L-1,M-1} \end{bmatrix} \odot \begin{bmatrix} \lambda^{(2)}_{0,0} & \cdots & 1 \\ \vdots & \ddots & \vdots \\ 1 & \cdots & \lambda^{(2)}_{2L-1,M-1} \end{bmatrix} \odot e^{-j2\pi\phi} \quad \text{Eq. (9)}$$

where ⊙ represents the Hadamard product (i.e. element-wise multiplication). In Equation 9, the matrix $\Lambda_{A1}$ corresponds to a first-stage quantization and the matrix $\Lambda_{A2}$ corresponds to a second-stage quantization. Additionally, in the matrix $\Lambda_{A2}$ the low-resolution beam coefficients are assigned a value of '1'. While the above equation shows elements $\lambda_{0,M-1}^{(2)}$ and $\lambda_{2L-1,0}^{(2)}$ to having values of '1', these values are exemplary and are based on the coarse amplitude of the beam coefficient amplitudes. In other embodiments, different elements of the matrix $\Lambda_{A2}$ will have values of '1.' Note that the parameter M in Equation 9 is the same as parameter M in Equation 3, above. Further note that the parameter M in Equations 3 and 9 may be the same as the parameter K in Equation 6, above.

Where the first-stage quantization uses 1-bit, then the first stage becomes a bitmap of the strong coefficients for which high-resolution amplitude/phase information is indicated using matrix $\Lambda_{A2}$.

Figure 2A:
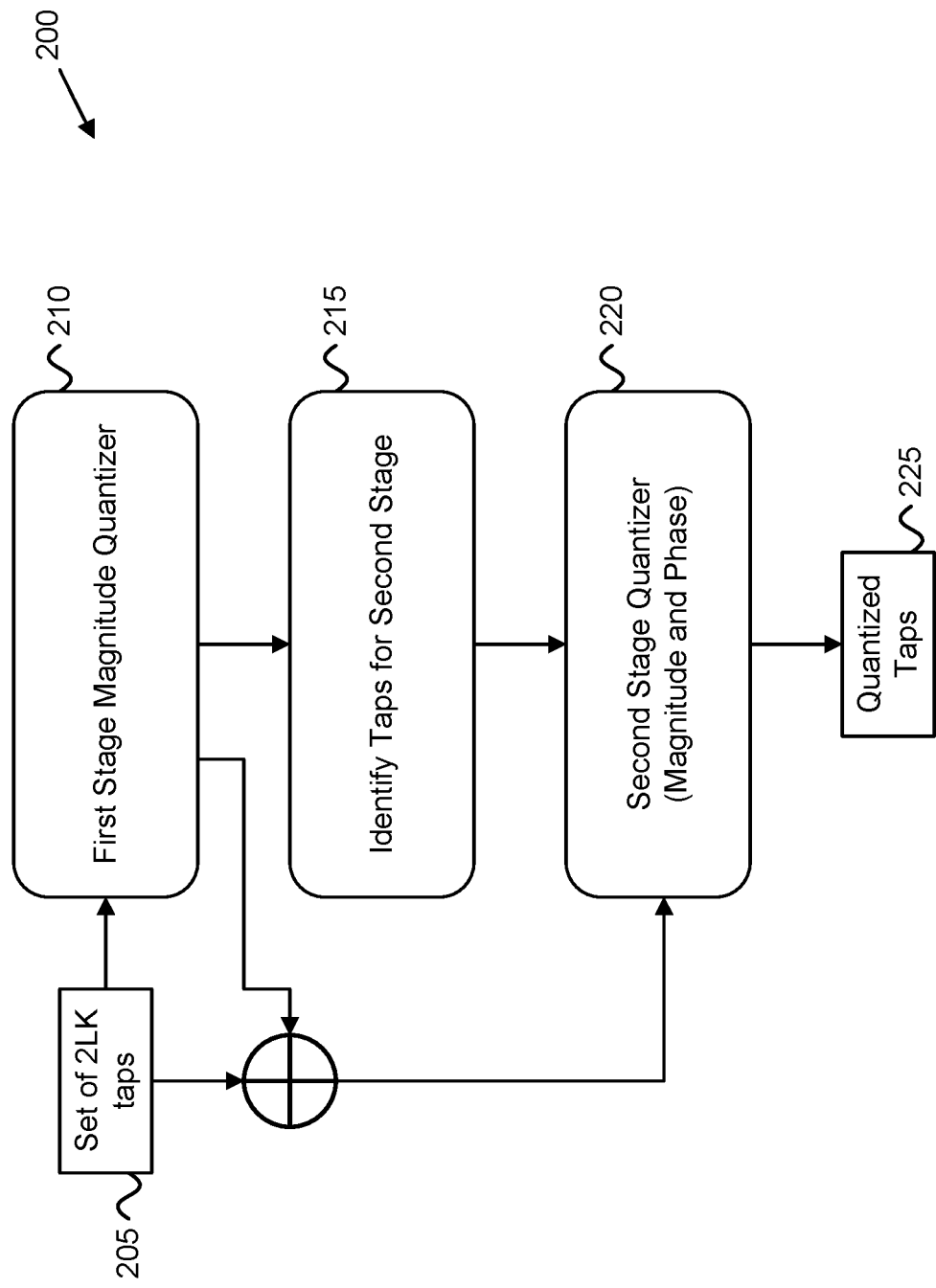
FIG. 2A is a diagram illustrating one embodiment of a multi-stage quantization procedure for codebook compression.

FIG. 2A depicts a multi-stage quantization procedure 200 for codebook compression, according to embodiments of the disclosure. First K taps common to all beams are identified and coded using A bits (e.g., calculated using Equation 6, above). The 2LK taps 205 (K per beam) are input to a first stage quantizer 210 which scalar quantizes the magnitudes of these taps using fewer bits than actually allocated for quantizing magnitudes for non-zero taps.

For example, if the bits allocated to code the magnitudes are 3 bits/4 bits then the first stage quantizer 210 may use two bits to code the magnitudes. The output of the first stage quantizer 210 may now be used to identify the number of taps for each beam (see block 215).

Let the quantized magnitudes in the first stage for the j-th tap of the i-th beam be given by $g_{ij}$. The beams which have higher sum of quantized values of their taps in the first stage quantizer 210 may now be allocated a greater number of taps and so on, using:

$$Q_i = \sum_{j=1}^{Nsb} q_{ij} \qquad \text{Equation (11)}$$

where the beams are arranged in decreasing order and higher number of taps are allocated to beams with higher value of Q.

Similarly, taps which have lowest values in the first stage may be zeroed out and not allocated any extra bits in the second stage quantizer 220. Taps with the next higher first stage values may be allocated lower number of bits in the second stage and the taps with highest values may be allocated the higher number of bits in the second stage quantizer 220. Let beam k ended up having $L_k$ taps. Now the quantized values $q_{kj}$ are arranged in the decreasing order and only first $L_k$ taps in this order are allocated non-zero amplitude and phase bits in the second stage quantizer 220, resulting in quantized taps 225. Note that having a first stage quantizer 210 with increasing step size improves efficiency (like A-law or mu-law companding the signal (i.e., signal processing by compressing and expanding) to mitigate the detrimental effects of a channel with limited dynamic range).

Figure 2B:
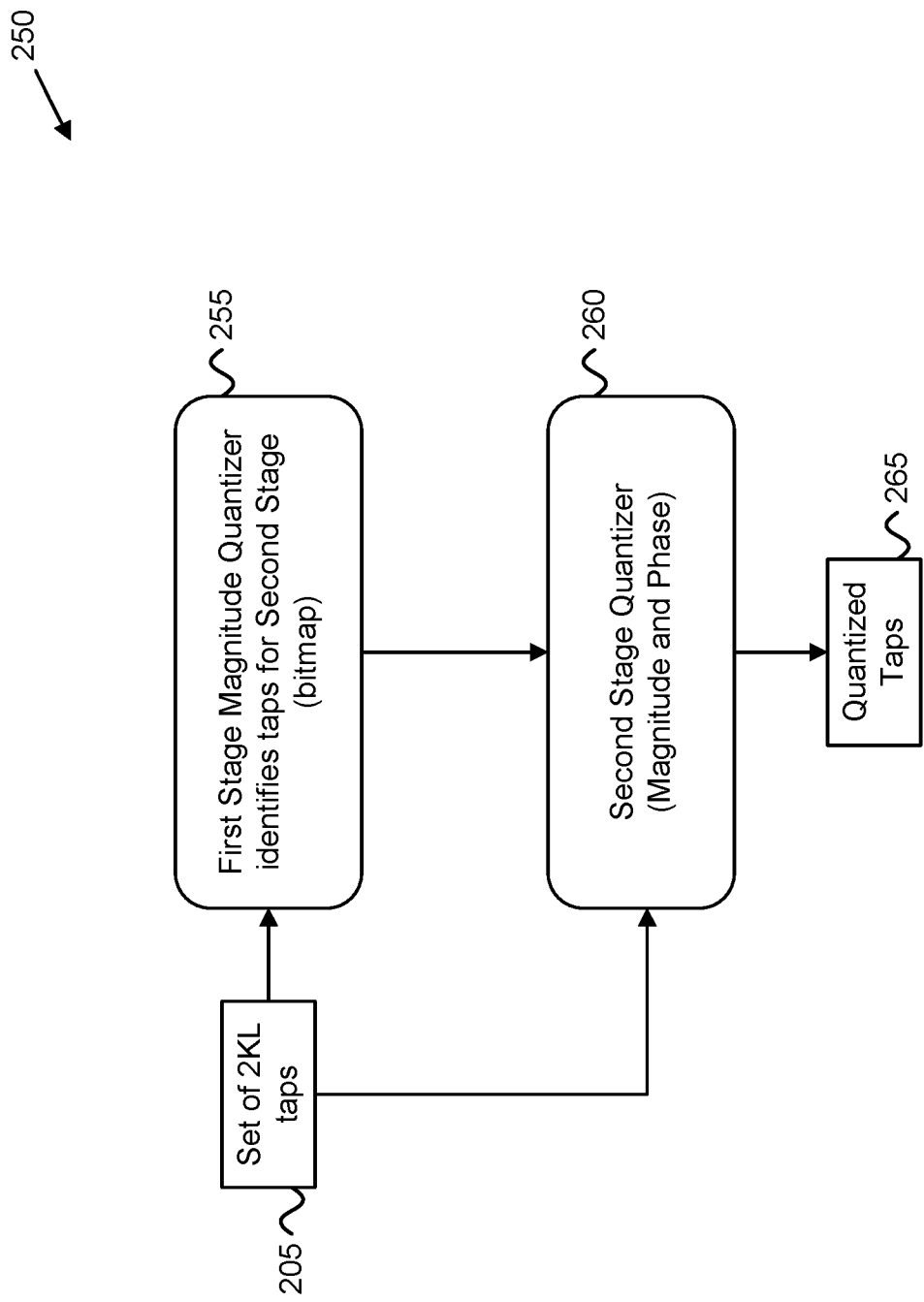
FIG. 2B is a diagram illustrating another embodiment of a multi-stage quantization procedure for codebook compression.

FIG. 2B depicts a multi-stage quantization procedure 250 for codebook compression, according to embodiments of the disclosure. First, K taps common to all beams are identified and coded using A bits (calculated using equation 6, above). Now the 2LK taps 205 (K per beam) are input to a first stage quantizer 255 which scalar quantizes the magnitudes of these taps using one bit. Accordingly, the output of the first stage quantizer 255 is a bitmap indicating which taps are to be quantized with amplitude and phase bits. Only the taps indicated in the bitmap are allocated non-zero amplitude and phase bits in the second stage quantizer 260, resulting in quantized taps 265.

In various embodiments, the UE is configured with the fraction β of coefficients to report and selects a first-stage quantizing threshold so that a fixed number 2βLM of coefficients are indicated by the bitmap.

Table 1 shows overhead calculation for multi-stage quantization as described herein. In various embodiments, fixed numbers of coefficients are allocated per beam. Denoting the number of coefficients allocated for the strongest to the weakest beam as $M_i$, i=1, 2, . . . , 2L, where $\sum_{i=1}^{2L} M_i = K_0$. Examples of a distribution of number of reported coefficients vs. beam is given in the first column of Table 1. In the first row, the strongest beam's contribution to the total of $K_0$ coefficients is $M_1=3$, the third beam strongest contribution is $M_3=2$, etc. Here the relative strength of the beam is energy of the coefficient with the highest energy.

This scheme's overhead calculation is given in Table 1. The number of bits for basis set indication is given by $\hat{A}\sum_{i=1}^{2L}(K-M_i)$. This value is based on the two-level quantization scheme where the first level of quantized amplitude information consists of A bits for all M coefficients of the common set within a beam. At the first line assume 3 bits are for amplitude quantization, then $\hat{A}=2$ bits could be used to represent the coefficients of all the beams. By summing the square of the two-bit amplitudes of all coefficients within a beam, an approximation of the beam's energy can be formed and from all of the beams' energies, an ordering of the beam energies can be formed based on these approximate energies. From the beam ordering, the number of coefficients of the second-level quantization information signaled for each beam can be determined. The second-level quantization information is the least significant bits of those coefficients with the highest 2-bit coefficient energy within a beam. Combining the first and second level quantized amplitudes yields 3-bit coefficient amplitudes for beam i's coefficients with the largest coefficient energy (at least in terms of their 2-bit amplitude representations). Each of the entry in the Table 1 is for the sub-band size $N_{sb}=13$.

TABLE 1

Overhead calculation
Multi-stage quantization

| number of taps per beam, $M_{r(i)}$ | beam selection + rotation | over-sampling indication | max beam indication | basis set indication overhead | amp/phase overhead | total overhead |
|---|---|---|---|---|---|---|
| [3 3 2 2 2 2 1 1] | 11 | 2 | 3 | 23 | 96 | 135 |
| [4 4 4 3 3 2 2 1] | 11 | 2 | 3 | 26 | 138 | 180 |
| [4 4 3 3 3 3 2 2] | 11 | 2 | 3 | 24 | 144 | 184 |
| [5 5 4 4 4 4 3 3] | 11 | 2 | 3 | 25 | 192 | 233 |

FIG. 3A depicts one example of beam energies 305 (for 8 beams) and FIG. 3B depicts one example of quantization 310 of coefficient amplitudes for these beams, according to embodiments of the disclosure. As depicted, eight beams are measured in the example, with the beams being ranked according to beam energy (from highest to lowest) as: Beam2, Beam6, Beam8, Beam7, Beam5, Beam4, Beam1, Beam3. In various embodiments, the two strongest beams (Beam2 and Beam6) are allocated four coefficients for reporting (i.e., Mi=4 for Beam2 and Beam6), the four second-strongest beams (i.e., Mi=3 for Beam8, Beam7, Beam5, and Beam4) are allocated three coefficients for reporting (i.e., Mi=3 for Beam4, Beam5, Beam7, and Beam8), and the two weakest beams (Beam1 and Beam3) are allocated two coefficients for reporting (i.e., Mi=2 for Beam1 and Beam3).

FIG. 4A depicts an example of first stage quantization and FIG. 4B depicts and example of second stage quantization using the beam coefficients of FIG. 3B, according to embodiments of the disclosure. FIGS. 4A-4B show the decomposition of the coefficient amplitudes into the sum of first stage amplitudes 405 and second stage amplitudes 410. During the first stage quantization, a coarse amplitude is indicated. In the first stage quantization depicted in FIG. 4A, the first stage amplitudes 405 indicate the highest multiple of 2 that is less than or equal to the beam coefficient amplitude. Put in other words, the first stage amplitudes 405 indicate the two most significant bits of the beam coefficient amplitude. In certain embodiments, each value of the first stage amplitudes 405 may be indicated using a 2-bit mapping (i.e., $q_A$=2). As an example, '00' may be used to indicate '0', '01' may be used to indicate '2', '10' may be used to indicate '4', and '11' may be used to indicate '6'.

For each beam, the Mi highest beam coefficient indices are shown with strong outline. Note that in the multi-stage quantization depicted in FIGS. 4A-4B, in the event of a tie (more than one beam coefficient having the same amplitude value), a beam coefficient are further ranked according to coefficient index, such that a beam coefficient with a lower index is ranked higher than a beam coefficient with the same amplitude but higher index. The first stage amplitudes 405 are used to determine the ordering of the beams and the Mi coefficients with the largest amplitudes are further quantized in the second stage quantization.

The second stage amplitudes 410 indicate additional information for only the Mi strongest coefficients for each beam. Note that for the Mi strongest coefficients of each beam, the sum of the first stage amplitude 405 and the second stage amplitude 410 equals the coefficient amplitude shown in FIG. 3B. In various embodiments, the value of each second stage amplitudes 410 may be indicated using 1-bit (i.e., $q_A'$=1). Note that the second stage amplitudes 410 indicate the least significant bits of the beam coefficient amplitudes.

While not depicted in FIGS. 4A-4B, the beam coefficient phases may be encoded (e.g., using a first-stage quantizer) using a first amount of bits (i.e., $q_P$ number of bits) and additional bits (i.e., $q_P'$ number of bits) may be used to encode phases (e.g., using a second-stage quantizer) for only the Mi strongest coefficients for each beam, determined by amplitude value.

FIG. 5A depicts an example of first stage quantization and FIG. 5B depicts an example of second stage quantization using the beam coefficients of FIG. 3B, according to embodiments of the disclosure. The multi-stage quantization depicted in FIGS. 5A-5B is an alternative to the multi-stage quantization depicted in FIGS. 4A-4B and uses two fields (i.e., first stage amplitudes 405 and second stage amplitudes 510) to indicate amplitude information. The first stage amplitudes 405 indicate the two most significant bits of the beam coefficient amplitudes, as described above with reference to FIG. 4A. For each beam, the Mi highest beam coefficient indices are shown with strong outline. However, the second stage amplitude 510 is a bitmap of the least significant bits of the Mi highest amplitude coefficients in a beam ordered from lowest to highest index within a beam, then from strongest to weakest beam.

Here, the first four bits indicate the least significant bits of the highest amplitude coefficients in Beam2 (recall $M_2$=4), the next four bits indicate the least significant bits of the highest amplitude coefficients in Beam6 (recall $M_6$=4), the next three bits indicate the least significant bits of the highest amplitude coefficients in Beam8 (recall $M_8$=3), the next three bits indicate the least significant bits of the highest amplitude coefficients in Beam7 (recall $M_7$=3), the next three bits indicate the least significant bits of the highest amplitude coefficients in Beam5 (recall $M_5$=3), the next three bits indicate the least significant bits of the highest amplitude coefficients in Beam4 (recall $M_4$=3), the next two bits indicate the least significant bits of the highest amplitude coefficients in Beam1 (recall $M_1$=2), and the last two bits indicate the least significant bits of the highest amplitude coefficients in Beam3 (recall $M_3$=2).

While not depicted in FIGS. 5A-5B, the beam coefficient phases may be encoded (e.g., using a first-stage quantizer) using a first amount of bits (i.e., $q_P$ number of bits) and additional bits (i.e., $q_P'$ number of bits) may be used to encode phases (e.g., using a second-stage quantizer) for only the Mi strongest coefficients for each beam, determined by amplitude value.

FIG. 6A is a diagram illustrating an example of first stage quantization and FIG. 6B depicts an example of second stage quantization using the beam coefficients of FIG. 3B, according to embodiments of the disclosure. In the multi-stage quantization depicted in FIGS. 6A-6B, the first quantization stage (i.e., low-resolution) uses a single bit to indicate strong coefficients. At the second quantization stage (i.e., high-resolution), amplitude values for those strong coefficients are indicated using additional bits, shown as second stage amplitudes 610.

As depicted, the first stage amplitudes 605 produces a bitmap indicating which beams have strong coefficients (e.g., amplitude values above a threshold amount). The second stage quantization then quantizes the beams with strong coefficients to indicate amplitude values and phase values (not shown). For example, three bits may be used in the second stage to quantize the amplitudes 610 of the strong coefficients. In certain embodiments, the coefficients may be normalized with respect to a coefficient having the largest value among the strong coefficients.

Figure 7:
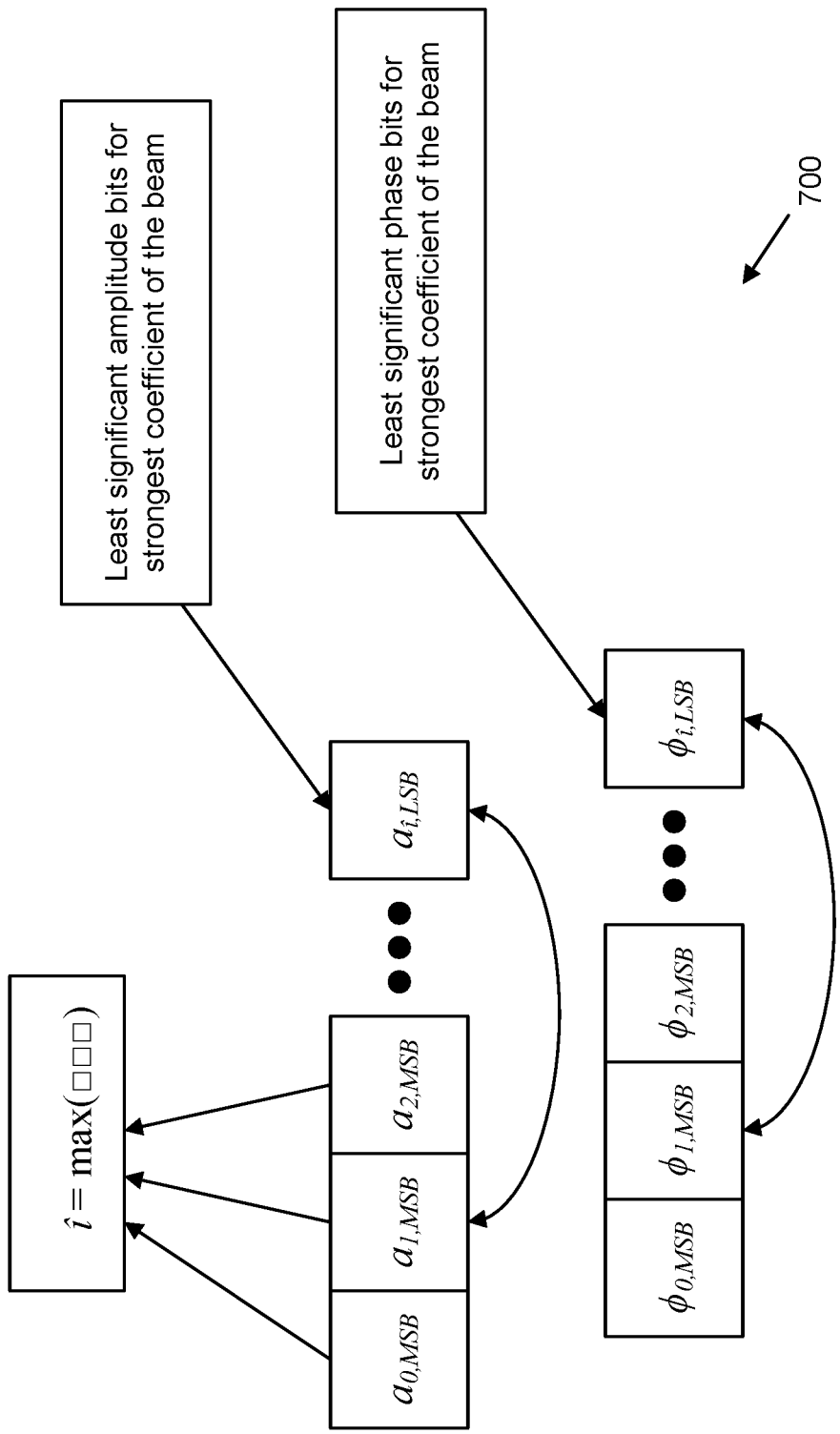
FIG. 7 is a diagram illustrating one embodiment of two-stage quantization of beam coefficients.

FIG. 7 depicts one example 700 of two-stage quantization of a beam's amplitude and phase coefficients. The index of the coefficient with highest 3-bit magnitude is $\hat{\imath}$=1. The example shown in FIG. 7 is for the case of M=4 coefficients per beam.

In this scheme four bits of amplitude and four bits of phase are used to represent the beam's strongest coefficient while 3 bits of amplitude and 3 bits of phase are used to represent the remaining coefficients of the beam. In order to decode the uplink control message containing these representations it is of course necessary to know which of the beam's coefficients is strongest. One way is to include an indication with length cell ($\log_2$ M) for each beam (where 'ceil(x)' represents the ceiling function of argument x).

However, the multi-stage quantization method described above can also be used with no additional signaling of the strongest beam.

One beam's worth of amplitude and phase quantization coefficients are shown with the most significant amplitude bits for each coefficient followed by the least significant bit of the coefficient whose first stage amplitude representation (i.e. three bits) is largest. Similarly, the least significant phase bit for the coefficient with largest first stage amplitude follows the first stage representations of the beam's phase coefficients. In the general case of $N_{MSB}$ first stage bits and $N_{LSB}$ second stage bits, the beams amplitude coefficients $a_m$, m=1, 2, ..., M are given by $$a_i = \begin{cases} 2^N_{LSB} a_{i,MSB} + a_{i,LSB}, & i = \hat{\imath} \\ 2^N_{LSB} a_{i,MSB} & i \neq \hat{\imath} \end{cases}, \quad \text{Equation (12)}$$

Figure 8:
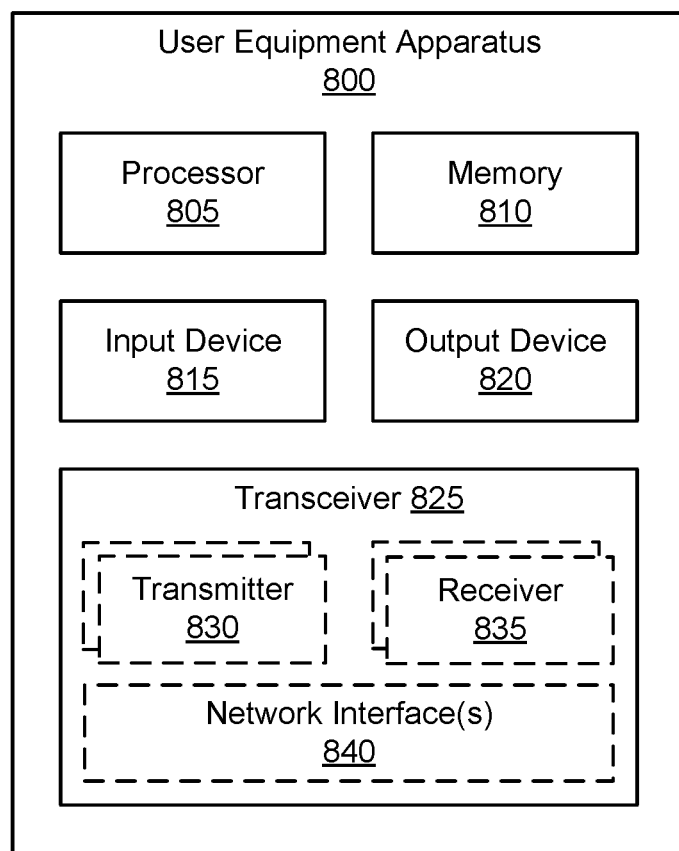
FIG. 8 is a schematic block diagram illustrating one embodiment of a user equipment apparatus that may be used for CSI feedback with Type-II codebook compression.

FIG. 8 depicts a user equipment apparatus 800 that may be used for Type-II codebook compression, according to embodiments of the disclosure. In various embodiments, the user equipment apparatus 800 is used to implement one or more of the solutions described above. The user equipment apparatus 800 may be one embodiment of the remote unit 105, described above. Furthermore, the user equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 performs two-stage quantization of the set of taps generated from the singular vector coefficients, as discussed above. Specifically, the processor 805 may generate a set of singular vector coefficients corresponding to a plurality of beams and perform an initial quantization for a set of tap magnitudes based on the singular vector coefficients. From the quantization results, the processor 805 may identify a subset of beams and corresponding taps having higher quantized tap magnitudes and perform an additional quantization for the subset of beams and corresponding taps, wherein the subset of beams is quantized with a greater number of bits than the remainder of the beams.

In various embodiments, the processor 805 identifies a set of beams based on one or more reference signals received by the transceiver 825. The processor 805 may then generate a set of taps associated with each beam in the set of beams based on the reference signal. The processor 805 identifies a common subset of tap indices that is same over the set of beams and generates a combinatorial codeword representing the common subset of tap indices. Via the transceiver 825, the processor 805 reports the combinatorial codeword for the common subset as part of a CSI feedback report.

In some embodiments, the size of the set of coefficients associated with each beam is equal to a sub-band size. In certain embodiments, the number of bits in the combinatorial codeword for the set of tap indices is based on the combination $$\binom{N_{sb}-1}{K-1},$$

where $N_{sb}$ represents the sub-band size and the value K is the size of the set of tap indices. In various embodiments, the processor 805 computes the number of bits in the combinatorial codeword using Equation 6, above. In some embodiments, the processor 805 quantizes the coefficient values using multiple stages.

In various embodiments, there is a coefficient value associated with each of the tap indices for all the beams. In certain embodiments, the number of coefficient values is equal to the product of the number of beams and the size of the set of tap indices. Thus, where 2L represents the number of beams (i.e., two polarizations per beam) and where K represents the size of the set of tap indices, then the number of coefficient values is the quantity 2LK.

In some embodiments, the processor 805 generates a sequence of first stage coefficient indices wherein each coefficient index corresponds to a coefficient value and identifies a subsequence of first stage coefficient indices. The processor 805 also generates second stage coefficient indices corresponding to the subsequence of first stage coefficient indices and reports (via transceiver) the first and second stage coefficient indices as part of the CSI feedback report.

In certain embodiments, the sequence of first stage coefficient indices is a bitmap. In certain embodiments, the first stage coefficient indices identify non-zero tap values. In such embodiments, the second stage coefficient indices are generated based on the tap values corresponding to the subsequence of first stage coefficient indices. For example, amplitude and phase values corresponding to the coefficient indices having non-zero tap values may be encoded via the second stage.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to Type-II codebook compression. For example, the memory 810 may store reference signals, beam sets, coefficients, tap indices, tap values, codewords, CSI feedback, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

In various embodiments, the transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. Although only one transmitter 830 and one receiver 835 are illustrated, the user equipment apparatus 800 may have any suitable number of transmitters 830 and receivers 835. Further, the transmitter (s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
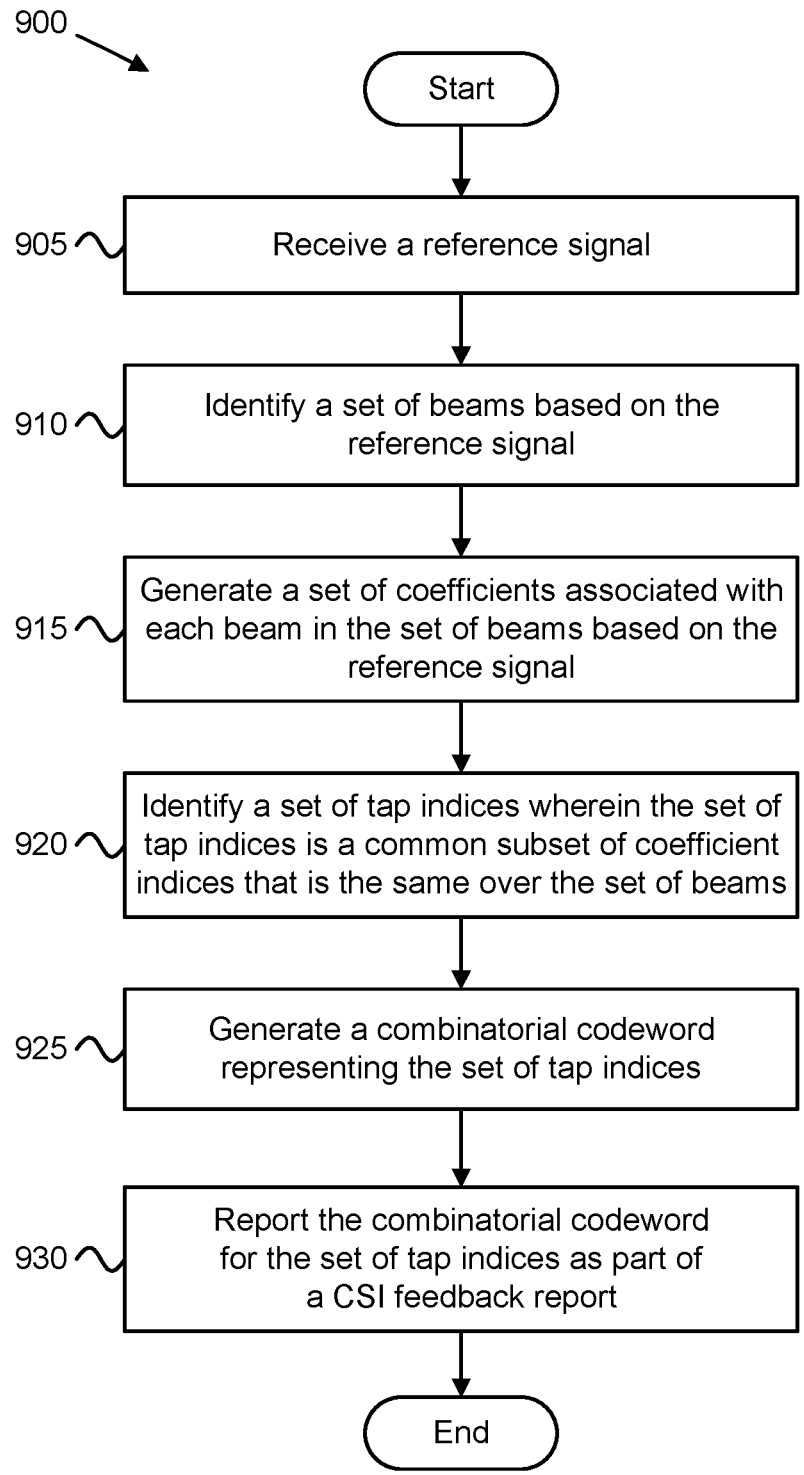
FIG. 9 is a flowchart diagram illustrating one embodiment of a method that may be used for CSI feedback with Type-II codebook compression.

FIG. 9 depicts one embodiment of a method 900 for Type-II codebook compression, according to embodiments of the disclosure. In various embodiments, the method 900 is performed by the remote unit 105 and/or the user equipment apparatus 800, described above. In some embodiments, the method 900 is performed by a processor, such as a microcontroller, a microprocessor, a central processing unit (CPU), a graphics processing unit (GPU), an auxiliary processing unit, a FPGA, or the like.

The method 900 begins and receives 905 a reference signal. The method 900 includes identifying 910 a set of beams based on the reference signal. The method 900 includes generating 915 a set of coefficients associated with each beam in the set of beams based on the reference signal. The method 900 includes identifying 920 a set of tap indices wherein the set of tap indices is a common subset of coefficient indices that is the same over the set of beams. The method 900 includes generating 925 a combinatorial codeword representing the set of tap indices. The method 900 includes reporting 930 the combinatorial codeword for the set of tap indices as part of a CSI feedback report. The method 900 ends.

Disclosed herein is a first apparatus for Type-II codebook compression, according to embodiments of the disclosure. The first apparatus may be implemented by a UE device for Type-II codebook compression using a DFT-based Type-II codebook compression, such as the remote unit 105 and/or the user equipment apparatus 800. The first apparatus includes a processor and a transceiver that receives a reference signal. The processor identifies a set of beams based on the reference signal and generates a set of taps associated with each beam in the set of beams based on the reference signal. The processor identifies a common subset of tap indices that is same over the set of beams and generates a combinatorial codeword representing the common subset of tap indices. Via the transceiver, the processor reports the combinatorial codeword for the common subset as part of a CSI feedback report.

In some embodiments, the size of the set of coefficients associated with each beam is equal to a sub-band size. In certain embodiments, the number of bits in the combinatorial codeword for the set of tap indices is based on the combination $$\binom{N_{sb}-1}{K-1},$$

where $N_{sb}$ represents the sub-band size and the value K is the size of the set of tap indices. For example, Equation 6 may be used to compute the number of bits in the combinatorial codeword. In some embodiments, the processor quantizes the coefficient values using multiple stages.

In various embodiments, there is a coefficient value associated with each of the tap indices for all the beams. In certain embodiments, the number of coefficient values is equal to the product of the number of beams and the size of the set of tap indices. Thus, where 2L represents the number of beams (i.e., two polarizations per beam) and where K represents the size of the set of tap indices, then the number of coefficient values is the quantity 2LK.

In some embodiments, the processor further generates a sequence of first stage coefficient indices wherein each coefficient index corresponds to a coefficient value and identifies a subsequence of first stage coefficient indices. Here, the processor also generates second stage coefficient indices corresponding to the subsequence of first stage coefficient indices and reports (via transceiver) the first and second stage coefficient indices as part of the CSI feedback report.

In certain embodiments, the sequence of first stage coefficient indices is a bitmap. In certain embodiments, the first stage coefficient indices identify non-zero tap values. In such embodiments, the second stage coefficient indices are generated based on the tap values corresponding to the subsequence of first stage coefficient indices.

Disclosed herein is a first method for Type-II codebook compression, according to embodiments of the disclosure. The first method may be performed by a UE device for Type-II codebook compression using a DFT-based Type-II codebook compression, such as the remote unit 105 and/or the user equipment apparatus 800. The first method includes receiving a reference signal and identifying a set of beams based on the reference signal. The first method includes generating a set of coefficients associated with each beam in the set of beams based on the reference signal and identifying a set of tap indices wherein the set of tap indices is a common subset of coefficient indices that is the same over the set of beams. The first method includes generating a combinatorial codeword representing the set of tap indices and reporting the combinatorial codeword for the set of tap indices as part of a CSI feedback report.

In some embodiments of the first method, the size of the set of coefficients associated with each beam is equal to a sub-band size. In certain embodiments, the number of bits in the combinatorial codeword for the set of tap indices is based on the combination $$\binom{N_{sb}-1}{K-1},$$

where $N_{sb}$ represents the sub-band size and the value K is the size of the set of tap indices. For example, Equation 6 may be used to compute the number of bits in the combinatorial codeword. In some embodiments, the first method includes quantizing the coefficient values using multiple stages.

In various embodiments of the first method, there is a coefficient value associated with each of the tap indices for all the beams. In certain embodiments, the number of coefficient values is equal to the product of the number of beams and the size of the set of tap indices. Thus, where 2L represents the number of beams (i.e., two polarizations per beam) and where K represents the size of the set of tap indices, then the number of coefficient values is the quantity 2LK.

In some embodiments, the first method includes generating a sequence of first stage coefficient indices wherein each coefficient index corresponds to a coefficient value and identifying a subsequence of first stage coefficient indices. Here, the first method also includes generating second stage coefficient indices corresponding to the subsequence of first stage coefficient indices and reporting the first and second stage coefficient indices as part of the CSI feedback report.

In certain embodiments, the sequence of first stage coefficient indices is a bitmap. In certain embodiments, the first stage coefficient indices identify non-zero tap values. In such embodiments, the second stage coefficient indices are generated based on the tap values corresponding to the subsequence of first stage coefficient indices.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a UE device for Type-II codebook compression using a Discrete Fourier Transformation-based Type-II codebook compression, the method comprising:
  receiving a reference signal;
  identifying a set of beams based on the reference signal;
  generating a set of coefficients associated with each beam in the set of beams based on the reference signal;
  identifying a set of tap indices wherein the set of tap indices is a common subset of coefficient indices that is the same over the set of beams;
  generating a combinatorial codeword representing the set of tap indices; and
  reporting the combinatorial codeword for the set of tap indices as part of a Channel State Information ("CSI") feedback report.

2. The method of claim 1, wherein the size of the set of coefficients associated with each beam is equal to a sub-band size.

3. The method of claim 2, wherein the number of bits in the combinatorial codeword for the set of tap indices is based on the expression $$\binom{N_{sb}-1}{K-1},$$

where $N_{sb}$ represents the sub-band size and the value K is the size of the set of tap indices.

4. The method of claim 2, wherein there is a coefficient value associated with each of the tap indices for all the beams.

5. The method of claim 4, wherein the number of coefficient values is equal to the product of the number of beams and the size of the set of tap indices.

6. The method of claim 4, further comprising:
generating a sequence of first stage coefficient indices wherein each coefficient index corresponds to a coefficient value;
identifying a subsequence of first stage coefficient indices;
generating second stage coefficient indices corresponding to the subsequence of first stage coefficient indices; and
reporting the first and second stage coefficient indices as part of the CSI feedback report.

7. The method of claim 6, wherein the sequence of first stage coefficient indices is a bitmap.

8. The method of claim 6, wherein the first stage coefficient indices identify non-zero tap values.

9. The method of claim 6, wherein the second stage coefficient indices are generated based on the tap values corresponding to the subsequence of first stage coefficient indices.

10. The method of claim 4, further comprising quantizing the coefficient values using multiple stages.

11. A UE apparatus for Type-II codebook compression using a Discrete Fourier Transformation-based Type-II codebook compression, the apparatus comprising:
a transceiver that receives a reference signal; and
a processor that:
identifies a set of beams based on the reference signal;
generates a set of taps associated with each beam in the set of beams based on the reference signal;
identifies a common subset of tap indices that is same over the set of beams;
generates a combinatorial codeword representing the common subset of tap indices; and
reports the combinatorial codeword for the common subset as part of a Channel State Information ("CSI") feedback report.

12. The apparatus of claim 11, wherein the size of the set of taps associated with each beam is equal to a sub-band size.

13. The apparatus of claim 12, wherein the number of bits in the combinatorial codeword for the common subset of tap indices is based on the expression $$\binom{N_{sb}-1}{K-1},$$

where $N_{sb}$ represents the sub-band size and the value K is the size of the common subset.

14. The apparatus of claim 12, wherein there is a tap value associated with each of the tap indices for all the beams.

15. The apparatus of claim 14, wherein the number of tap values is equal to the product of the number of beams and the size of the common subset.

16. The apparatus of claim 14, wherein the processor further:
generates a sequence of first stage coefficient indices wherein each coefficient index corresponds to a tap value;
identifies a subsequence of first stage coefficient indices;
generates second stage coefficient indices corresponding to the subsequence of first stage coefficient indices; and
reports the first and second stage coefficient indices as part of the CSI feedback report.

17. The apparatus of claim 16, wherein the sequence of first stage coefficient indices is a bitmap.

18. The apparatus of claim 16, wherein the first stage coefficient indices identify non-zero tap values.

19. The apparatus of claim 16, wherein the processor generates the second stage coefficient indices based on the tap values corresponding to the subsequence of first stage coefficient indices.

20. The apparatus of claim 14, wherein the processor further quantizes the tap values using multiple stages.

* * * * *